(12) United States Patent
Wei et al.

(10) Patent No.: US 12,393,334 B2
(45) Date of Patent: Aug. 19, 2025

(54) VOICE ACTIVITY DETECTION DEVICE AND METHOD

(71) Applicant: GETAC TECHNOLOGY CORPORATION, New Taipei (TW)

(72) Inventors: Jen-Ching Wei, Taipei (TW); Lu-Ting Ko, Taipei (TW)

(73) Assignee: Getac Technology Corporation, New Taipei (TW)

( * ) Notice: Subject to any disclaimer, the term of this patent is extended or adjusted under 35 U.S.C. 154(b) by 224 days.

(21) Appl. No.: 18/318,649

(22) Filed: May 16, 2023

(65) Prior Publication Data
US 2024/0153530 A1    May 9, 2024

Related U.S. Application Data

(60) Provisional application No. 63/449,272, filed on Mar. 1, 2023, provisional application No. 63/423,453, filed on Nov. 7, 2022.

(51) Int. Cl.
*G06F 3/06*  (2006.01)
*G08B 13/196*  (2006.01)
(Continued)

(52) U.S. Cl.
CPC .......... *G06F 3/0604* (2013.01); *G06F 3/0655* (2013.01); *G06F 3/0676* (2013.01); *G06F 3/0679* (2013.01); *G08B 13/19621* (2013.01); *G10L 15/22* (2013.01); *G10L 21/034* (2013.01); *G10L 21/0364* (2013.01);
(Continued)

(58) Field of Classification Search
USPC ...................................... 704/1–504
See application file for complete search history.

(56) References Cited

U.S. PATENT DOCUMENTS

| | | | |
|---|---|---|---|
| 8,155,968 B2* | 4/2012 | Sugiyama | G10L 15/22 |
| | | | 704/233 |
| 2008/0167868 A1* | 7/2008 | Kanevsky | G10L 15/24 |
| | | | 704/E15.041 |

(Continued)

FOREIGN PATENT DOCUMENTS

| | | |
|---|---|---|
| CN | 105120063 A | 12/2015 |
| CN | 108668017 A | 10/2018 |

(Continued)

*Primary Examiner* — Marcus T Riley
(74) *Attorney, Agent, or Firm* — Cooper Legal Group, LLC

(57) ABSTRACT

A voice activity detection method includes a voice pickup module, a processing module coupled to the voice pickup module and a prompt module coupled to the processing module. The processing module is used to perform a voice activity detection method, including: receiving voice information by the voice pickup module; acquiring a volume value of the voice information by the processing module; determining by the processing module whether the volume value is less than or equal to a first volume threshold; when it is determined that the volume value is less than or equal to the first volume threshold, generating by the prompt module a first prompt message for increasing the volume value; and when it is determined that the volume value is more than the first volume threshold, generating by the prompt module a second prompt message that indicates a volume value standard has been satisfied.

24 Claims, 5 Drawing Sheets

(51) Int. Cl.
  *G10L 15/22*    (2006.01)
  *G10L 21/034*   (2013.01)
  *G10L 21/0364*  (2013.01)
  *G10L 25/78*    (2013.01)
  *H01H 9/16*     (2006.01)
  *H04N 7/18*     (2006.01)

(52) U.S. Cl.
  CPC ............. *G10L 25/78* (2013.01); *H01H 9/161* (2013.01); *H04N 7/185* (2013.01); *G10L 2025/786* (2013.01)

(56) References Cited

U.S. PATENT DOCUMENTS

| | | | |
|---|---|---|---|
| 2009/0210227 A1* | 8/2009 | Sugiyama | G10L 15/22 901/46 |
| 2010/0217837 A1* | 8/2010 | Ansari | H04L 12/2814 709/224 |
| 2015/0179186 A1* | 6/2015 | Swierk | G10L 25/60 704/276 |
| 2019/0344185 A1* | 11/2019 | Fargo | G06T 19/20 |
| 2022/0021978 A1* | 1/2022 | Gui | G06F 3/167 |
| 2024/0153530 A1* | 5/2024 | Wei | G06F 1/163 |

FOREIGN PATENT DOCUMENTS

| | | |
|---|---|---|
| CN | 108320742 B | 9/2021 |
| CN | 108630202 B | 12/2021 |
| JP | H06075588 A | 3/1994 |
| TW | 201414274 A | 4/2014 |

* cited by examiner

VOICE ACTIVITY DETECTION DEVICE AND METHOD

The application claims priority to both U.S. Provisional Application No. 63/423,453 filed Nov. 7, 2022, and also U.S. Provisional Application No. 63/449,272 filed Mar. 1, 2023, the disclosure of which are hereby incorporated by reference herein in their entireties.

BACKGROUND OF THE INVENTION

Field of the Invention

The present invention relates to a voice activity detection technique, and more particularly, to a voice activity detection device and method for voice-to-text conversion.

Description of the Prior Art

Line inputs for actual voice pickup of most built-in microphones require Microsoft applications to manage values of gain. However, when the gain value is set inappropriately or when the user cannot confirm the actual microphone sound received by a voice recognition algorithm model, the actual sound of the microphone is processed (quantizing the gain value) by a predetermined built-in control unit of the microphone, such that the original volume cannot be restored, and this affects the accuracy of the voice output by the algorithm model. In particular, in a situation of an outdoor environment with background noise, the accuracy of voice-to-text conversion of a processed voice is rather low.

SUMMARY OF THE INVENTION

The present invention provides a voice activity detection device and method capable of effectively increasing a level signal generated by the volume when a voice is received and improving the accuracy of voice-to-text conversion in an outdoor environment with background noise.

A voice activity detection device provided by the present invention includes a voice pickup module, a processing module and a prompt module. The processing module is coupled to the voice pickup module, and the prompt module is coupled to the processing module. The processing module is used to perform a voice activity detection method, including: receiving voice information by the voice pickup module; acquiring a volume value of the voice information by the processing module; determining by the processing module whether the volume value is less than or equal to a first volume threshold; when it is determined that the volume value is less than or equal to the first volume threshold, generating by the prompt module a first prompt message for increasing the volume value; and when it is determined that the volume value is more than the first volume threshold, generating by the prompt module a second prompt message that indicates a volume value standard has been satisfied.

A voice activity detection method provided by the present invention is suitable for a voice activity detection device. The voice activity detection device includes a voice pickup module, a processing module and a prompt module. The voice activity detection method includes: receiving voice information by the voice pickup module; acquiring a volume value of the voice information by the processing module; determining by the processing module whether the volume value is less than or equal to a first volume threshold; when it is determined that the volume value is less than or equal to the first volume threshold, generating by the prompt module a first prompt message for increasing the volume value; and when it is determined that the volume value is more than the first volume threshold, generating by the prompt module a second prompt message that indicates a volume value standard has been satisfied.

In one embodiment of the present invention, the first volume threshold is between 50 dB and 60 dB.

In one embodiment of the present invention, the voice activity detection method above further includes: determining by the processing module whether the volume value is less than or equal to a second volume threshold; when it is determined that the volume value is less than or equal to the second volume threshold, generating by the prompt module the first prompt message for increasing the volume value; and when it is determined that the volume value is more than the second volume threshold, determining by the processing module whether the volume value is less than or equal to the first volume threshold.

In one embodiment of the present invention, the second volume threshold is between 40 dB and 50 dB.

In one embodiment of the present invention, the voice activity detection method further includes: acquiring a volume adjustment value of the voice pickup module by the processing module to generate the volume value of the voice information.

In one embodiment of the present invention, the voice activity detection method above further includes: when it is determined that the volume value is more than the first volume threshold, determining by the processing module whether the volume value is less than or equal to a third volume threshold; when it is determined that the volume value is more than the third volume threshold, adjusting the volume value by the processing module to be less than the third volume threshold; and when it is determined that the volume value is less than or equal to the third volume threshold, generating by the prompt module the second prompt message that indicates the volume value standard has been satisfied.

A voice activity detection device provided by the present invention includes a voice pickup module, a processing module and a prompt module. The processing module is coupled to the voice pickup module, and the prompt module is coupled to the processing module. The processing module is used to perform a voice activity detection method, including: receiving voice information by the voice pickup module; acquiring a volume value of the voice information by the processing module; determining by the processing module whether the volume value is between a first volume threshold and a second volume threshold; when it is determined that the volume value is between the first volume threshold and the second volume threshold, generating by the prompt module a first prompt message that indicates a volume value standard has been satisfied; and when it is determined that the volume value is not between the first volume threshold and the second volume threshold, adjusting the volume value to a predetermined volume value by the processing module.

A voice activity detection method provided by the present invention is suitable for a voice activity detection device. The voice activity detection device includes a voice pickup module, a processing module and a prompt module. The voice activity detection method includes: receiving voice information by the voice pickup module; acquiring a volume value of the voice information by the processing module; determining by the processing module whether the volume value is between a first volume threshold and a second volume threshold; when it is determined that the volume value is between the first volume threshold and the second volume threshold, generating by the prompt module a first prompt message that indicates a volume value standard has been satisfied; and when it is determined that the volume value is not between the first volume threshold and the second volume threshold, adjusting the volume value to a predetermined volume value by the processing module.

In one embodiment of the present invention, the first volume threshold is more than the second volume threshold, and the predetermined volume value is between the first volume threshold and the second volume threshold.

In one embodiment of the present invention, the first volume value threshold is 90 dB, the second volume threshold is between 50 dB and 60 dB, and the predetermined volume value is between 60 dB and 70 dB.

A voice activity detection device provided by the present invention includes a voice pickup module, a processing module and a prompt module. The processing module is coupled to the voice pickup module, and the prompt module is coupled to the processing module. The processing module is used to perform a voice activity detection method, including: receiving voice information by the voice pickup module; acquiring a volume value of the voice information by the processing module; determining by the processing module whether the volume value is less than or equal to a first volume threshold; when it is determined that the volume value is less than or equal to the first volume threshold, generating by the prompt module a first prompt message for increasing the volume value; when it is determined that the volume value is more than the first volume threshold, determining by the processing module whether the volume value is less than or equal to a second volume threshold; when it is determined that the volume value is less than or equal to the second volume threshold, adjusting the volume value to a predetermined volume value by the processing module; when it is determined that the volume value is more than the second volume value, determining by the processing module whether the volume value is less or equal to a third volume threshold; when it is determined that the volume value is less than or equal to the third volume threshold, generating by the prompt message the first prompt message that indicates a volume value standard has been satisfied; and when it is determined that the volume value is more than the third volume threshold, adjusting the volume value to a predetermined volume value by the processing module.

A voice activity detection method provided by the present invention is suitable for a voice activity detection device. The voice activity detection device includes a voice pickup module, a processing module and a prompt module. The voice activity detection method includes: receiving voice information by the voice pickup module; acquiring a volume value of the voice information by the processing module; determining by the processing module whether the volume value is less than or equal to a first volume threshold; when it is determined that the volume value is less than or equal to the first volume threshold, generating by the prompt module a first prompt message for increasing the volume value; when it is determined that the volume value is more than the first volume threshold, determining by the processing module whether the volume value is less than or equal to a second volume threshold; when it is determined that the volume value is less than or equal to the second volume threshold, adjusting the volume value to a predetermined volume value by the processing module; when it is determined that the volume value is more than the second volume value, determining by the processing module whether the volume value is less or equal to a third volume threshold; when it is determined that the volume value is less than or equal to the third volume threshold, generating by the prompt message the first prompt message that indicates a volume value standard has been satisfied; and when it is determined that the volume value is more than the third volume threshold, adjusting the volume value to a predetermined volume value by the processing module.

In one embodiment of the present invention, the third volume threshold is more than the second volume threshold, the second volume threshold is more than the first volume threshold, and the predetermined volume value is between the third volume threshold and the second volume threshold.

In one embodiment of the present invention, the third volume value threshold is 90 dB, the second volume threshold is between 50 dB and 60 dB, the first volume threshold is between 40 dB and 50 dB, and the predetermined volume value is between 60 dB and 70 dB.

The voice activity detection method of the present invention is capable of effectively increasing a level signal generated by the volume when a voice is received and improving the accuracy of voice-to-text conversion in an outdoor environment with background noise.

To better understand the above and other objects, features and advantages of the present invention, preferred embodiments are described in detail with the accompanying drawings below.

DETAILED DESCRIPTION OF THE EMBODIMENTS

To better clearly understand the objects, technical solution and advantages of the present invention, details of the present invention are given by way of the embodiments with the accompanying drawings below. It should be noted that the specific embodiments described herein are merely for illustrating the present invention and are not to be construed as limitations to the present invention. On the basis of the embodiments of the present invention, all other embodiments arrived by a person skilled in the art without involving inventive skills are to be encompassed within the scope of protection of the present invention.

It should also be noted that, given that no conflicts are incurred, the individual features in the embodiments of the present invention can be combined with one another, and this is also encompassed within the scope of protection of the present invention. The terms "first", "second" and "third" used in the present invention are not to be interpreted as limitations to data or execution orders, but are used to merely differentiate the same items or similar items having basically the same functions and effects.

Moreover, it should be noted that, in the embodiments of the present invention, a coupling method includes a direct electrical connection, or an electrical connection via other elements, modules or devices. The term "coupled" hereinafter includes the patterns above, and such repeated details are to be omitted.

Figure 1:
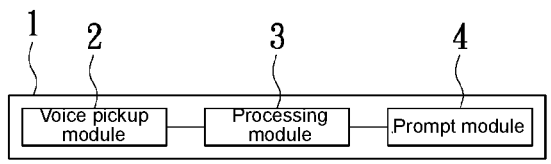
FIG. 1 is a block diagram of a voice activity detection device provided according to an embodiment of the present invention.

Refer to FIG. 1 showing a block diagram of a voice activity detection device provided according to an embodiment of the present invention. A voice activity detection device 1 of the embodiment includes a voice pickup module 2, a processing module 3 and a prompt module 4. The processing module 3 is coupled to the voice pickup module 2, and the prompt module 4 is coupled to the processing module 3. In another embodiment, the voice activity detection device 1 is, for example but not limited to, hardware, firmware and software. In another embodiment, the voice pickup module 2 is, for example but not limited to, a microphone. In another embodiment, the processing module 3 is, for example but not limited to, a processing circuit, an encoding/decoding circuit, a noise reduction circuit and a memory circuit. In another embodiment, the prompt module 4 is, for example but not limited to, a display circuit, a light emitting circuit and a sound playback circuit, and is used to display the waveform and color of the voice and to emit an audio prompt.

In one embodiment, the voice activity detection device 1 includes an application interface to provide manual selection based on other software, for example but not limited to, a wavein mode according to a volume adjustment mode of the voice pickup module 2 in Multimedia Extensions (MME), a Windows Audio Session Application Programming Interface (WASAPI) mode that can directly receive the voice information received by the voice pickup module 2 through a WASAPI of the Universal Audio Architecture (UAA), and an automatic mode in which the voice activity detection device 1 itself can decide to use the wavein mode, the WASAPI mode, or the wavein mode and the WASAPI mode alternately.

Figure 2:
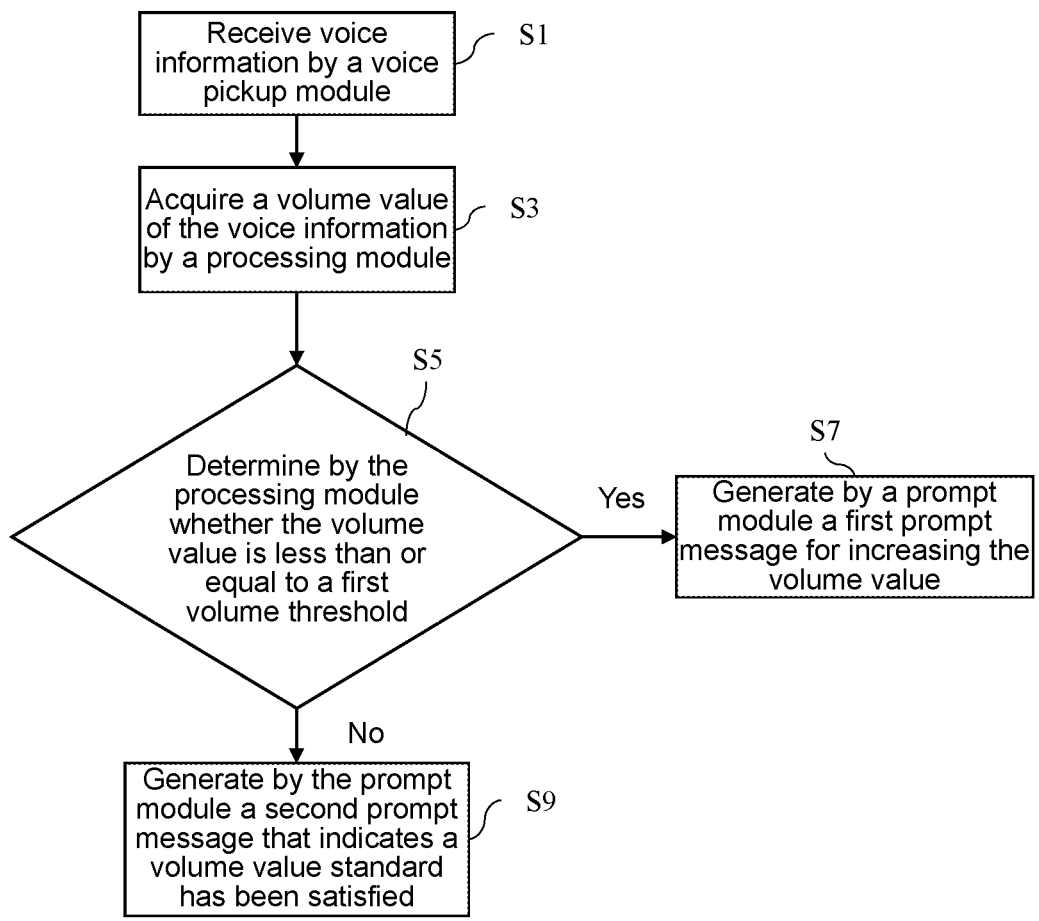
FIG. 2 is a flowchart of a voice activity detection method provided according to a first embodiment of the present invention.

Refer to FIG. 2 showing a flowchart of a voice activity detection method provided according to a first embodiment of the present invention. The voice activity detection method of the embodiment is suitable for the voice activity detection device 1 and is performed in the WASAPI mode and the automatic mode. The voice activity detection method is performed by the processing module 3 and includes the following steps. In step S1, voice information is received by the voice pickup module 2. In step S3, a volume value of the voice information is acquired by the processing module 3. In step S5, it is determined by the processing module 3 whether the volume value is less than or equal to a first volume threshold. In step S7, when it is determined that the volume value is less than or equal to the first volume threshold, a first prompt message for increasing the volume value is generated by the prompt module 4. In step S9, when it is determined that the volume value is more than the first volume threshold, a second prompt message that indicates a volume value standard has been satisfied is generated by the prompt module 4. In this embodiment, the first volume threshold is, for example but not limited to, between 40 dB and 50 dB, or between 50 dB and 60 dB. The first volume threshold may be set according to the actual environment or requirements, and the present invention is not limited to the volume ranges above. In this embodiment, when the first volume threshold is between 40 dB and 50 dB, the first prompt message is, for example but not limited to, a voice waveform and a waveform color such as an amplitude-free red waveform, and the second prompt message is, for example but not limited to, a voice waveform and a waveform color such as a minute amplitude yellow waveform. Alternatively, when the first volume threshold is between 50 dB and 60 dB, the first prompt message is, for example but not limited to, a voice waveform and a waveform color such as a minute amplitude yellow waveform, and the second prompt message is, for example but not limited to, a voice waveform and a waveform color such as a drastic amplitude green waveform.

In one embodiment, when the user selects the automatic mode via the application interface, the processing module 3 directly acquires the volume value of the voice information after the voice pickup module 2 receives the voice information, and this is not affected by the volume adjustment value of voice pickup of other Microsoft playback software. Thus, failure of correctly restoring the original volume is prevented and hence the accuracy of converting the voice information to text information is not affected. Next, the processing module 3 determines whether the volume value is less than or equal to the first volume threshold, for example, 50 dB. If the volume value is less than or equal to 50 dB, the prompt module 4 displays the first prompt message, such as a minute amplitude yellow waveform shown by the display circuit. If the volume value is more than 50 dB, the prompt module 4 displays the second prompt message, such as a drastic amplitude green waveform shown by the display circuit.

Figure 3:
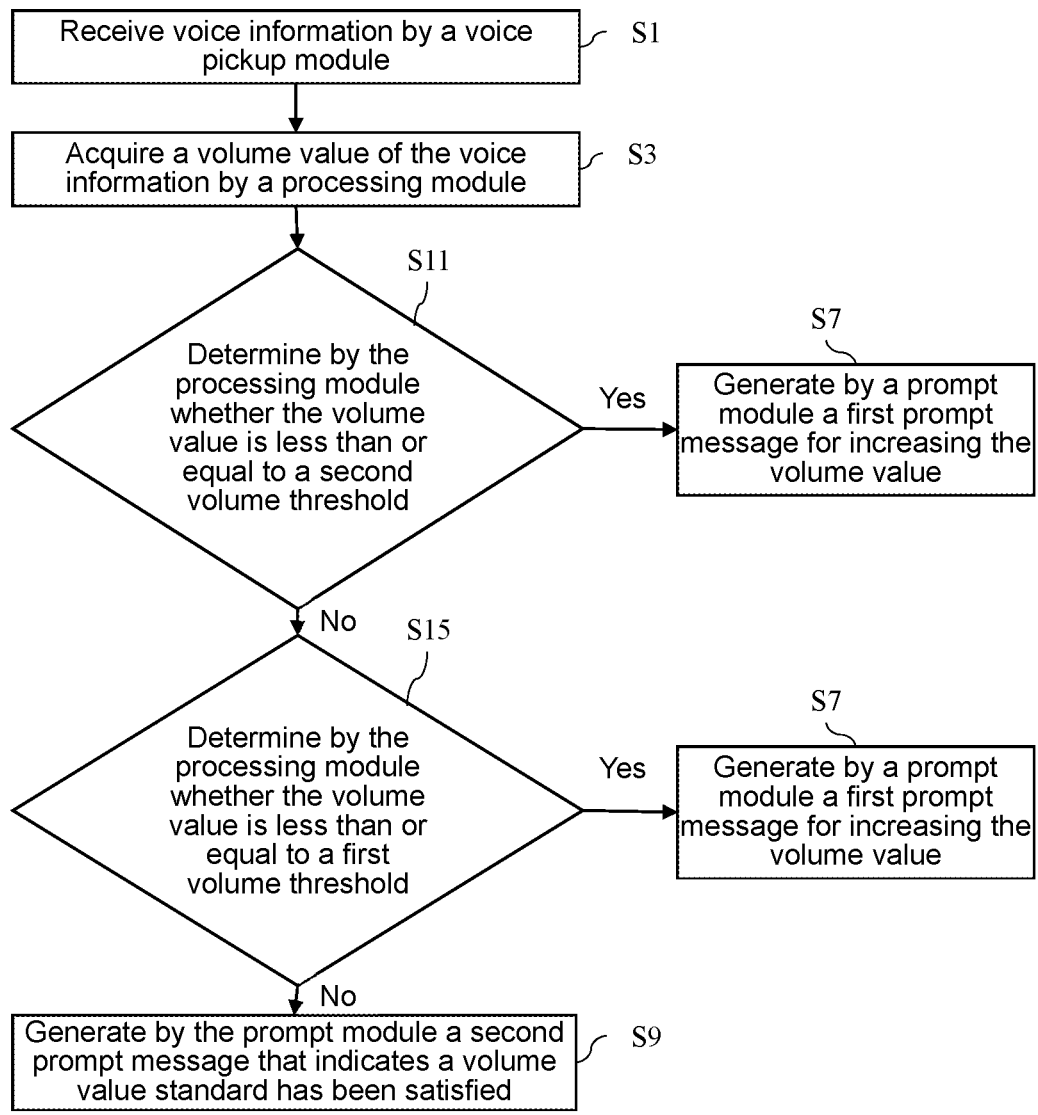
FIG. 3 is a flowchart of a voice activity detection method provided according to a second embodiment of the present invention.

Refer to FIG. 3 showing a flowchart of a voice activity detection method provided according to a second embodiment of the present invention. The voice activity detection method of the embodiment is suitable for the voice activity detection device 1 and is performed in the WASAPI mode and the automatic mode. The voice activity detection method is performed by the processing module 3 and includes the following steps. In step S1, voice information is received by the voice pickup module 2. In step S3, a volume value of the voice information is acquired by the processing module 3. In step S11, it is determined by the processing module 3 whether the volume value is less than or equal to a second volume threshold. In step S7, when it is determined that the volume value is less than or equal to the second volume threshold, a first prompt message for increasing the volume value is generated by the prompt module 4. In step S15, when it is determined that the volume value is more than the second volume threshold, it is determined by the processing module 3 whether the volume value is less than or equal to a first volume threshold. In step S7, when it is determined that the volume value is less than or equal to the first volume threshold, a first prompt message for increasing the volume value is generated by the prompt module 4. In step S9, when it is determined that the volume value is more than the first volume threshold, a second prompt message that indicates a volume value standard has been satisfied is generated by the prompt module 4. In this embodiment, the first volume threshold is, for example but not limit to, between 50 dB and 60 dB, and the second volume threshold is, for example but not limited to, between 40 dB and 50 dB, wherein the second volume threshold is less than the first volume threshold. The first volume threshold and the second volume threshold may be set according to the actual environment or requirements, and the present invention is not limited to the volume ranges above. In this embodiment, the first prompt message is, for example but not limited to, a voice waveform and a waveform color such as an amplitude-free red waveform or a minute amplitude yellow waveform, and the second prompt message is, for example but not limited to, a voice waveform and a waveform color such as a drastic amplitude green waveform.

In one embodiment, when the user selects the automatic mode via the application interface, the processing module 3 directly acquires the volume value of the voice information after the voice pickup module 2 receives the voice information, and this is not affected by the volume adjustment value of voice pickup of other Microsoft playback software. Thus, failure of correctly restoring the original volume is prevented and hence the accuracy of converting the voice information to text information is not affected. Next, the processing module 3 determines whether the volume value is less than or equal to the second volume threshold, for example, 45 dB. If the volume value is less than or equal to 45 dB, the prompt module 4 displays the first prompt message, such as an amplitude-free red waveform shown by the display circuit. If the volume value is more than 45 dB, the prompt module 4 displays the first prompt message, such as a minute amplitude yellow waveform shown by the display circuit. Next, the processing module 3 determines whether the volume value is less than or equal to the first volume threshold, for example, 55 dB. If the volume value is less than or equal to 55 dB, the prompt module 4 displays the first prompt message, such as a minute amplitude yellow waveform shown by the display circuit. If the volume value is more than 55 dB, the prompt module 4 displays the second prompt message, such as a drastic amplitude green waveform shown by the display circuit.

Figure 4:
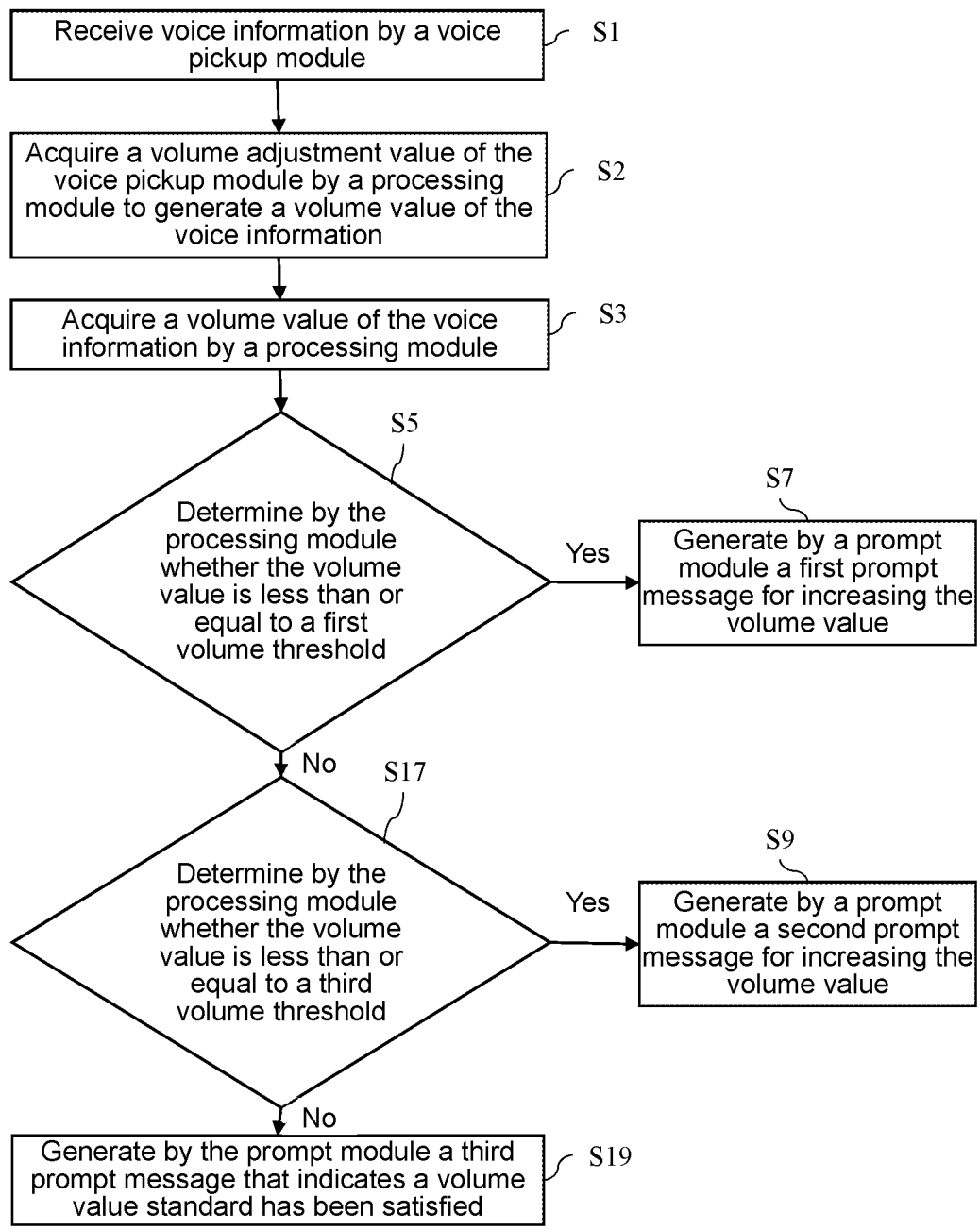
FIG. 4 is a flowchart of a voice activity detection method provided according to a third embodiment of the present invention.

Refer to FIG. 4 showing a flowchart of a voice activity detection method provided according to a third embodiment of the present invention. The voice activity detection method of the embodiment is suitable for the voice activity detection device 1 and is performed in the wavein mode. The voice activity detection method is performed by the processing module 3 and includes the following steps. In step S1, voice information is received by the voice pickup module 2. In step S2, a volume adjustment value of the voice pickup module 2 is acquired by the processing module 3 so as to generate a volume value of the voice information. In step S3, a volume value of the voice information is acquired by the processing module 3. In step S5, it is determined by the processing module 3 whether the volume value is less than or equal to a first volume threshold. In step S7, when it is determined that the volume value is less than or equal to the first volume threshold, a first prompt message for increasing the volume value is generated by the prompt module 4. In step S17, when it is determined that the volume value is more than the first volume threshold, it is determined by the processing module 3 whether the volume value is less than or equal to a third volume threshold. In step S19, when it is determined that the volume value is more than the third volume threshold, the volume value is adjusted to be less than the third volume threshold by the processing module 3. In step S9, when it is determined that the volume value is less than or equal to the third volume threshold, a second prompt message that indicates a volume value standard has been satisfied is generated by the prompt module 4.

In one embodiment, when the user selects the wavein mode via the application interface, the processing module 3 generates the volume value of the voice information according to the volume adjustment value of voice pickup of other playback software after the voice pickup module 2 receives the voice information. Next, the processing module 3 acquires the volume value of the voice information, and determines whether the volume value is less than or equal to the first volume threshold, for example, 55 dB. If the volume value is less than or equal to 55 dB, the user is prompted to increase the volume value of the voice information to 65 dB. If the volume value is more than 55 dB, the processing module 3 determines whether the volume value is less than or equal to the third volume threshold, for example, 90 dB. If the volume value is more than 90 dB, the processing module 3 adjusts the volume value to 65 dB so as to prevent sound pop during voice pickup. If the volume value is less than 65 dB, the processing module 3 continues acquiring the volume value of the voice information.

Figure 5:
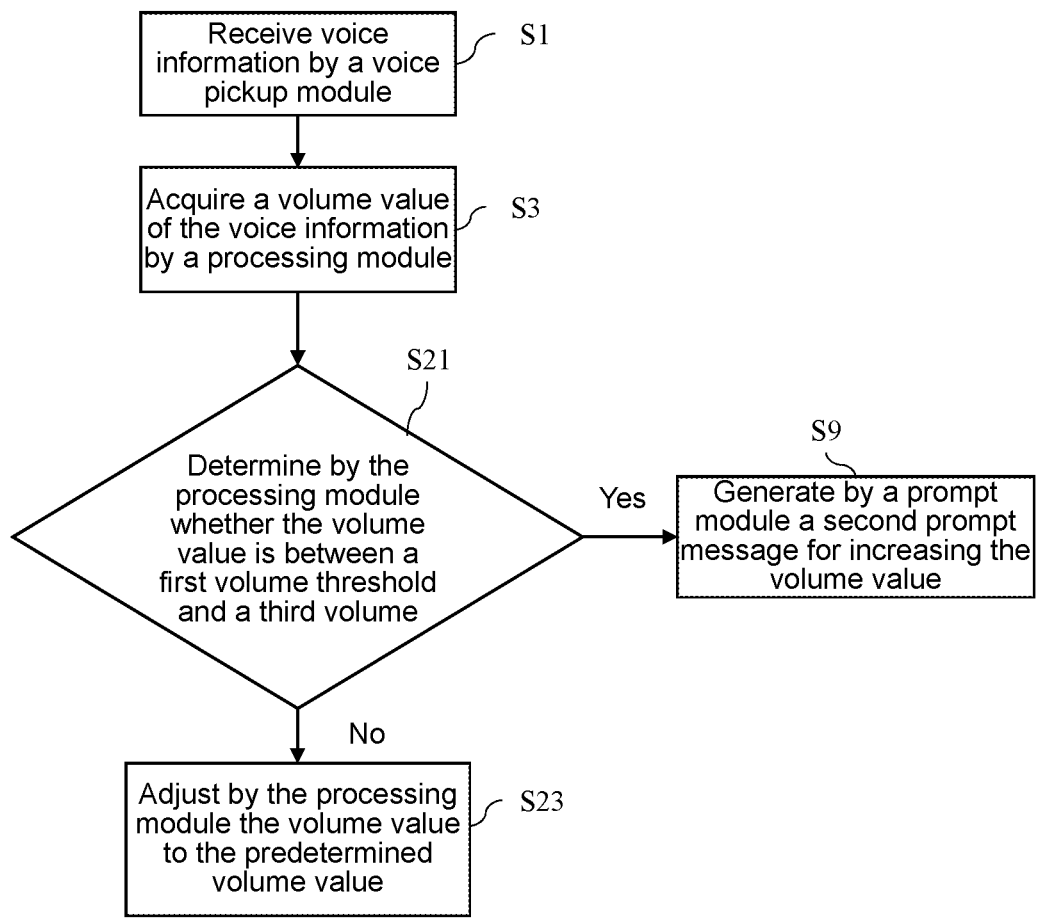
FIG. 5 is a flowchart of a voice activity detection method provided according to a fourth embodiment of the present invention.

Refer to FIG. 5 showing a flowchart of a voice activity detection method provided according to a fourth embodiment of the present invention. The voice activity detection method of the embodiment is suitable for the voice activity detection device 1 and is performed in the automatic mode. The voice activity detection method is performed by the processing module 3 and includes the following steps. In step S1, voice information is received by the voice pickup module 2. In step S3, a volume value of the voice information is acquired by the processing module 3. In step S21, it is determined by the processing module 3 whether the volume value is between a first volume threshold and a third volume threshold. In step S9, when it is determined that the volume value is between the first volume threshold and the third volume threshold, a second prompt message that indicates a volume value standard has been satisfied is generated by the prompt module 4. In step S23, when it is determined that the volume value is not between the first volume threshold and the third volume threshold, the volume value is adjusted to a predetermined volume value by the processing module 3. In this embodiment, the third volume threshold is more than the first volume threshold, and the predetermined volume value is between the third volume threshold and the first volume threshold. In this embodiment, the third volume threshold is, for example but not limited to, 90 dB, the first volume threshold is, for example but not limited to, between 50 dB and 60 dB, and the predetermined volume value is, for example but not limited to, between 60 dB and 70 dB. The third volume threshold, the first volume threshold and the predetermined volume value may be set according to the actual environment or requirements, and the present invention is not limited to the volume ranges above.

Figure 6:
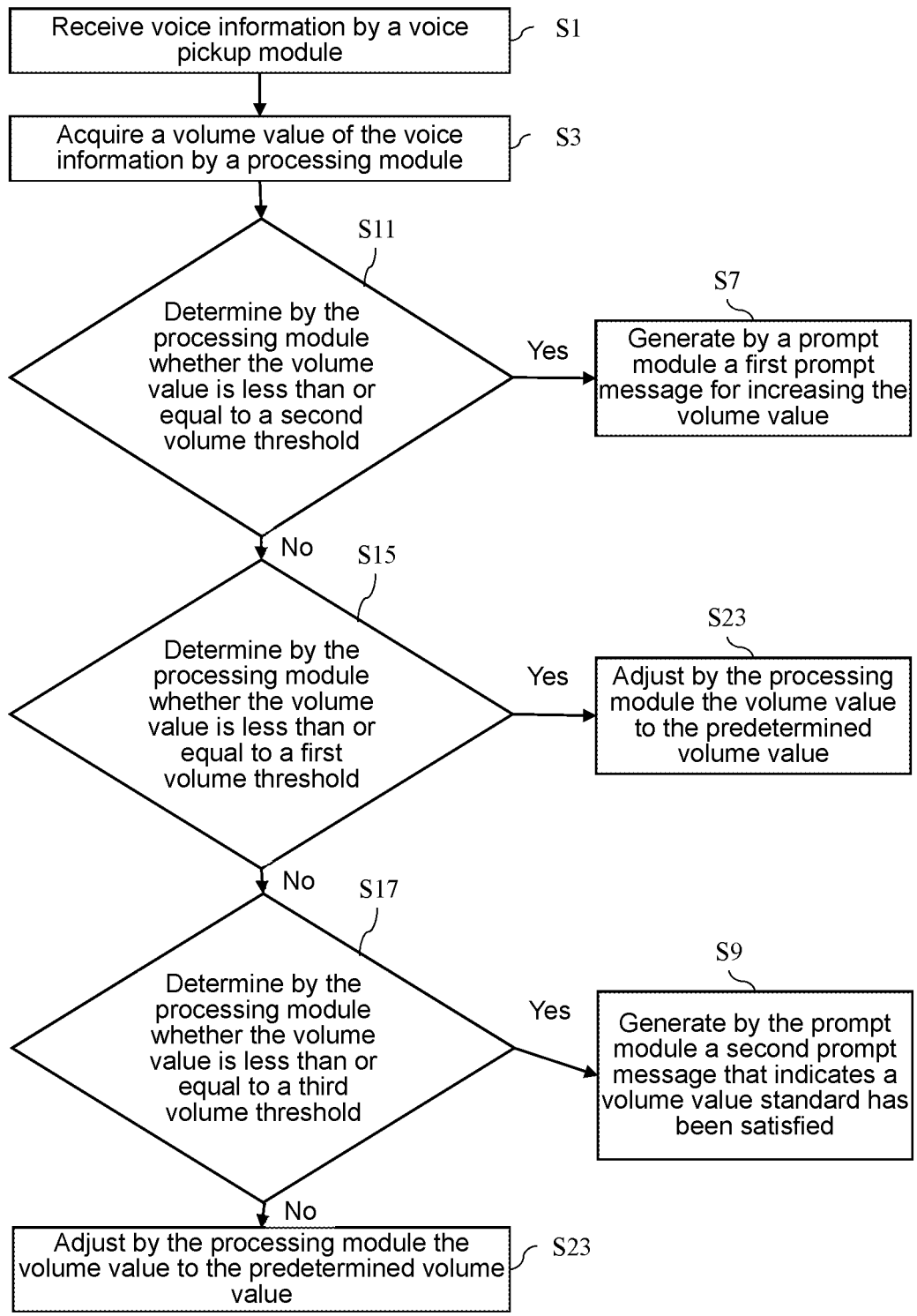
FIG. 6 is a flowchart of a voice activity detection method provided according to a fifth embodiment of the present invention.

Refer to FIG. 6 showing a flowchart of a voice activity detection method provided according to a fifth embodiment of the present invention. The voice activity detection method of the embodiment is suitable for the voice activity detection device 1 and is performed in the automatic mode. The voice activity detection method is performed by the processing module 3 and includes the following steps. In step S1, voice information is received by the voice pickup module 2. In step S3, a volume value of the voice information is acquired by the processing module 3. In step S11, it is determined by the processing module 3 whether the volume value is less than or equal to a second volume threshold. In step S7, when it is determined that the volume value is less than or equal to the second volume threshold, a first prompt message for increasing the volume value is generated by the prompt module 4. In step S15, when it is determined that the volume value is more than the second volume threshold, it is determined by the processing module 3 whether the volume value is less than or equal to a first volume threshold. In step S23, when it is determined that the volume value is less than or equal to the first volume threshold, the volume value is adjusted to a predetermined volume value by the processing module 3. In step S17, when it is determined that the volume value is more than the first volume threshold, it is determined by the processing module 3 whether the volume value is less than or equal to a third volume threshold. In step S9, when it is determined that the volume value is less than or equal to the third volume threshold, a second prompt message that indicates a volume value standard has been satisfied is generated by the prompt module 4. In step S23, when it is determined that the volume value is more than the third volume threshold, the volume value is adjusted to be less than the predetermined volume value by the processing module 3. In this embodiment, the third volume threshold is more than the first volume threshold, the first volume threshold is more than the second volume threshold, and the predetermined volume value is between the third volume threshold and the first volume threshold. In this embodiment, the third volume value is, for example but not limited to, 90 dB, the first volume threshold is, for example but not limited to, between 50 dB and 60 dB, the second volume threshold is, for example but not limited to, 40 dB and 50 dB, and the predetermined volume value is, for example but not limited to, between 60 dB and 70 dB. The third volume threshold, the second volume threshold, the first volume threshold and the predetermined volume value may be set according to the actual environment or requirements, and the present invention is not limited to the volume ranges above.

In conclusion, due to the voice activity detection method, the voice activity detection device provided by the present invention is capable of effectively increasing a level signal generated by the volume when a voice is received and improving the accuracy of voice-to-text conversion in an outdoor environment with background noise.

The present invention is disclosed as the embodiments above. However, these embodiments are not to be construed as limitation to the present invention. Slight modifications and variations may be made by a person skilled in the art without departing from the spirit and scope of the present invention. Therefore, the scope of protection of the present invention is to be accorded with the appended claims.

What is claimed is:

1. A voice activity detection method, suitable for a voice activity detection device, wherein the voice activity detection device comprises a voice pickup module, a processing module and a prompt module; the voice activity detection method comprising:
   receiving voice information by the voice pickup module;
   acquiring a volume value of the voice information by the processing module;
   determining by the processing module whether the volume value is less than or equal to a first volume threshold;
   when it is determined that the volume value is less than or equal to the first volume threshold, generating by the prompt module a first prompt message for increasing the volume value; and
   when it is determined that the volume value is more than the first volume threshold, generating by the prompt module a second prompt message that indicates a volume value standard has been satisfied.

2. The voice activity detection method according to claim 1, wherein the first volume threshold is between 50 dB and 60 dB.

3. The voice activity detection method according to claim 1, further comprising:
   determining by the processing module whether the volume value is less than or equal to a second volume threshold;
   when it is determined that the volume value is less than or equal to the second volume threshold, generating by the prompt module the first prompt message for increasing the volume value; and
   when it is determined that the volume value is more than the second volume threshold, determining by the processing module whether the volume value is less than or equal to the first volume threshold.

4. The voice activity detection method according to claim 3, wherein the second volume threshold is between 40 dB and 50 dB.

5. The voice activity detection method according to claim 1, further comprising:
   acquiring a volume adjustment value of the voice pickup module by the processing module so as to generate the volume value of the voice information.

6. The voice activity detection method according to claim 5, further comprising:
   when it is determined that the volume value is more than the first volume threshold, determining by the processing module whether the volume value is less than or equal to a third volume threshold;
   when it is determined that the volume value is more than the third volume threshold, adjusting the volume value to be less than the third volume threshold by the processing module; and
   when it is determined that the volume value is less than or equal to the third volume threshold, generating by the prompt module the second prompt message that indicates the volume value standard has been satisfied.

7. A voice activity detection device, comprising:
   a voice pickup module;
   a processing module, coupled to the voice pickup module; and
   a prompt module, coupled to the processing module;
   wherein the processing module is used to perform a voice activity detection method, the method comprising:
      receiving voice information by the voice pickup module;
      acquiring a volume value of the voice information by the processing module;
      determining by the processing module whether the volume value is less than or equal to a first volume threshold;
      when it is determined that the volume value is less than or equal to the first volume threshold, generating by the prompt module a first prompt message for increasing the volume value; and
      when it is determined that the volume value is more than the first volume threshold, generating by the prompt module a second prompt message that indicates a volume value standard has been satisfied.

8. The voice activity detection device according to claim 7, wherein the first volume threshold is between 50 dB and 60 dB.

9. The voice activity detection device according to claim 7, wherein the method further comprises:
   determining by the processing module whether the volume value is less than or equal to a second volume threshold;
   when it is determined that the volume value is less than or equal to the second volume threshold, generating by the prompt module the first prompt message for increasing the volume value; and when it is determined that the volume value is more than the second volume threshold, determining by the processing module whether the volume value is less than or equal to the first volume threshold.

10. The voice activity detection device according to claim 9, wherein the second volume threshold is between 40 dB and 50 dB.

11. The voice activity detection device according to claim 7, wherein the method further comprises:
acquiring a volume adjustment value of the voice pickup module by the processing module so as to generate the volume value of the voice information.

12. The voice activity detection device according to claim 11, wherein the method further comprises:
when it is determined that the volume value is more than the first volume threshold, determining by the processing module whether the volume value is less than or equal to a third volume threshold;
when it is determined that the volume value is more than the third volume threshold, adjusting the volume value to be less than the third volume threshold by the processing module; and
when it is determined that the volume value is less than or equal to the third volume threshold, generating by the prompt module the second prompt message that indicates the volume value standard has been satisfied.

13. A voice activity detection method, suitable for a voice activity detection device, wherein the voice activity detection device comprises a voice pickup module, a processing module and a prompt module; the voice activity detection method comprising:
receiving voice information by the voice pickup module;
acquiring a volume value of the voice information by the processing module;
determining by the processing module whether the volume value is between a first volume threshold and a second volume threshold;
when it is determined that the volume value is between the first volume threshold and the second volume threshold, generating by the prompt module a first prompt message that indicates a volume value standard has been satisfied; and
when it is determined that the volume value is not between the first volume threshold and the second volume threshold, adjusting the volume value to a predetermined volume value by the processing module.

14. The voice activity detection method according to claim 13, wherein the first volume threshold is more than the second volume threshold, and the predetermined volume value is between the first volume threshold and the second volume threshold.

15. The voice activity detection method according to claim 13, wherein the first volume threshold is 90 dB, the second volume threshold is between 50 dB and 60 dB, and the predetermined volume value is between 60 dB and 70 dB.

16. A voice activity detection device, comprising:
a voice pickup module;
a processing module, coupled to the voice pickup module; and
a prompt module, coupled to the processing module;
wherein the processing module is used to perform a voice activity detection method, the method comprising:
receiving voice information by the voice pickup module;
acquiring a volume value of the voice information by the processing module;
determining by the processing module whether the volume value is between a first volume threshold and a second volume threshold;
when it is determined that the volume value is between the first volume threshold and the second volume threshold, generating by the prompt module a first prompt message that indicates a volume value standard has been satisfied; and
when it is determined that the volume value is not between the first volume threshold and the second volume threshold, adjusting the volume value to a predetermined volume value by the processing module.

17. The voice activity detection device according to claim 16, wherein the first volume threshold is more than the second volume threshold, and the predetermined volume value is between the first volume threshold and the second volume threshold.

18. The voice activity detection device according to claim 17, wherein the first volume threshold is 90 dB, the second volume threshold is between 50 dB and 60 dB, and the predetermined volume value is between 60 dB and 70 dB.

19. A voice activity detection method, suitable for a voice activity detection device, wherein the voice activity detection device comprises a voice pickup module, a processing module and a prompt module; the voice activity detection method comprising:
receiving voice information by the voice pickup module;
acquiring a volume value of the voice information by the processing module;
determining by the processing module whether the volume value is less than or equal to a first volume threshold;
when it is determined that the volume value is less than or equal to the first volume threshold, generating by the prompt module a first prompt message for increasing the volume value;
when it is determined that the volume value is more than the first volume threshold, determining by the processing module whether the volume value is less than or equal to a second volume threshold;
when it is determined that the volume value is less than or equal to the second volume threshold, adjusting the volume value to a predetermined volume value by the processing module;
when it is determined that the volume value is more than the second volume threshold, determining by the processing module whether the volume value is less than or equal to a third volume threshold;
when it is determined that the volume value is less than or equal to the third volume threshold, generating by the prompt module a second prompt message that indicates a volume value standard has been satisfied; and
when it is determined that the volume value is more than the third volume threshold, adjusting the volume value to the predetermined volume value by the processing module.

20. The voice activity detection method according to claim 19, wherein the third volume threshold is more than the second volume threshold, the second volume threshold is more than the first volume threshold, and the predetermined volume value is between the third volume threshold and the second volume threshold.

21. The voice activity detection method according to claim 19, wherein the third volume threshold is 90 dB, the second volume threshold is between 50 dB and 60 dB, the first volume threshold is between 40 dB and 50 dB, and the predetermined volume value is between 60 dB and 70 dB.

22. A voice activity detection device, comprising:
a voice pickup module;
a processing module, coupled to the voice pickup module; and
a prompt module, coupled to the processing module;
wherein the processing module is used to perform a voice activity detection method, the method comprising:
  receiving voice information by the voice pickup module;
  acquiring a volume value of the voice information by the processing module;
  determining by the processing module whether the volume value is less than or equal to a first volume threshold;
  when it is determined that the volume value is less than or equal to the first volume threshold, generating by the prompt module a first prompt message for increasing the volume value;
  when it is determined that the volume value is more than the first volume threshold, determining by the processing module whether the volume value is less than or equal to a second volume threshold;
  when it is determined that the volume value is less than or equal to the second volume threshold, adjusting the volume value to a predetermined volume value by the processing module;
  when it is determined that the volume value is more than the second volume threshold, determining by the processing module whether the volume value is less than or equal to a third volume threshold;
  when it is determined that the volume value is less than or equal to the third volume threshold, generating by the prompt module a second prompt message that indicates a volume value standard has been satisfied; and
  when it is determined that the volume value is more than the third volume threshold, adjusting the volume value to the predetermined volume value by the processing module.

23. The voice activity detection device according to claim 22, wherein the third volume threshold is more than the second volume threshold, the second volume threshold is more than the first volume threshold, and the predetermined volume value is between the third volume threshold and the second volume threshold.

24. The voice activity detection device according to claim 22, wherein the third volume threshold is 90 dB, the second volume threshold is between 50 dB and 60 dB, the first volume threshold is between 40 dB and 50 dB, and the predetermined volume value is between 60 dB and 70 dB.

* * * * *